Aug. 25, 1959     B. E. ANDERSON     2,900,816
BOILING POINT TEMPERATURE MEASURING SYSTEM
Filed March 20, 1958
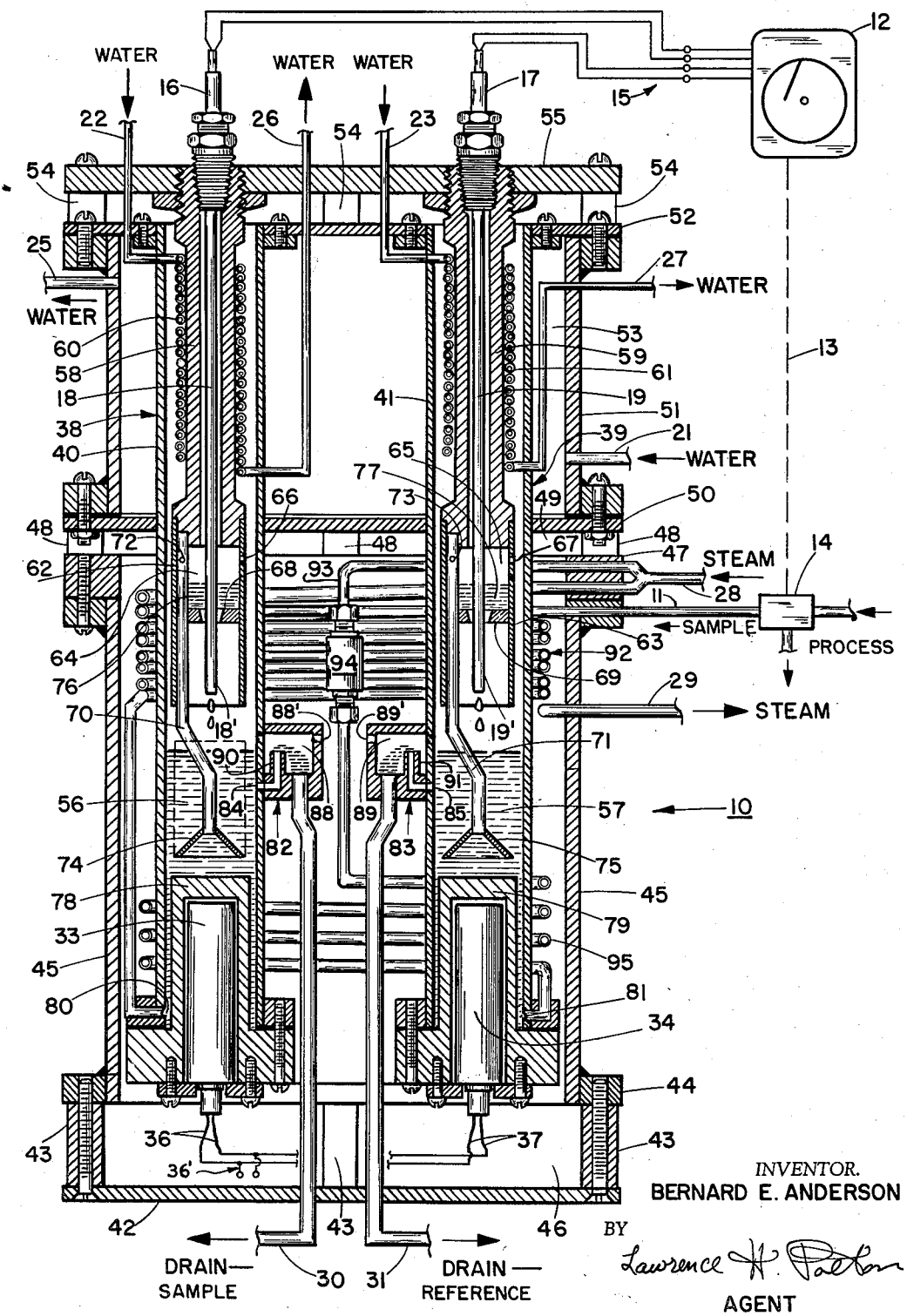
INVENTOR.
BERNARD E. ANDERSON
BY
Lawrence H. Patton
AGENT

United States Patent Office 2,900,816
Patented Aug. 25, 1959

2,900,816

BOILING POINT TEMPERATURE MEASURING SYSTEM

Bernard E. Anderson, North Attleboro, Mass., assignor to The Foxboro Company, Foxboro, Mass., a corporation of Massachusetts Application March 20, 1958, Serial No. 722,663

1 Claim. (Cl. 73—17)

This invention relates to temperature measurement and has particular reference to the measurement of the temperature at which liquids boil, by means of a percolator for flowing a film of boiling liquid over a temperature sensing element to provide a representation of the temperature at which that liquid boils, i.e., the temperature at the surface of a body of that liquid.

This invention provides such temperature measurement on a continuous process basis.

An illustrative use of this invention is as a means of providing a representation of the composition of a liquid, as for example, the concentration of a salt therein, or the concentration of one liquid in solution in another. The system of this invention is generally useful in the measurement of the temperature at which any liquid boils.

The system of this invention provides such temperature measurements according to the highly demanding needs of modern process systems, which require continuous, highly accurate measurement on a flowing sample basis.

This invention, accordingly, provides a system wherein a continuous flow of sample liquid is continuously measured as to the temperature at which it boils without loss of sample liquid component concentration, and in representation of the true boiling temperature condition at the surface of a body of such liquid.

A further feature of this invention is a compensation arrangement for canceling out the effects of barometric pressure changes on the liquid being measured.

It is, therefore, an object of this invention to provide a new and improved system for the measurement of the temperatures at which liquids boil.

A further object of this invention is to provide a system of this nature which operates independently of rate of flow therethrough.

Other objects and advantages of this invention will be in part apparent and in part pointed out hereinafter.

The drawing is a general schematic showing of an overall system embodying this invention, with sectional detail in the main portion thereof.

As an illustrative embodiment of this invention, the drawing illustrates a general overall system for measuring and controlling the concentration of one substance in solution in another. This may, for example, be a salt in a liquid such as sugar in water, sodium chloride in water, or one liquid in solution in another. The system of this invention measures the temperature at which a liquid boils, and in many cases, this is representative of the concentration of a component of the liquid.

As in the drawing, the overall system comprises measuring unit 10 with a sample liquid supply pipe 11 leading thereto, a recorder and controller instrument 12 of a suitable conventional type with means for controlling a process therefrom indicated by dotted line 13 to a schematic process block 14, with the sample inlet line 11 extending therefrom. Thus, for example, this control arrangement may be adjusting the concentration of a sample liquid component. At any rate, the sample liquid, as it enters the measuring unit 10, may be adjusted by adjusting the process in accordance with the temperature measurement in the measuring unit 10 in this fashion.

The illustrative embodiment of this invention as shown in the drawing is a differential measurement device wherein the temperatures at which the sample liquid and a reference liquid boil are taken and referenced against each other in the recording instrument 12 as indicated by electrical leads 15 from thermometer bulb outlets 16 and 17 at the top of the measuring unit 10. The thermometer bulbs themselves are indicated in the measuring unit 10 as at 18 and 19. These may, for example, be the usual conventional resistance thermometer bulbs with the resistance temperature sensing portions at the lower ends thereof as indicated at 18' and 19' respectively, The upper portion of the measuring unit 10 is a condensing system and, for this purpose, a water cooling arrangement is provided with water inlets 21, 22 and 23 provided to the measuring unit 10. The respective water outlets of this arrangement are indicated as individual outlets 25, 26 and 27.

The lower portion of the measuring unit 10 is a heating section or boiling section wherein the sample and reference liquids are percolated and, for this purpose, there is a steam inlet 28 adjacent the sample inlet 11 through the side of the measuring unit 10, and a steam outlet 29 also through the side of the measuring unit 10. The steam outlet 29 is one outlet end of the steam system initiated with the inlet 28. A second outlet is through the reference portion of the device as will be described hereinafter.

At the bottom of the measuring unit 10, there are two liquid drain pipes, item 30, for the drain-off of the sample liquid, and item 31 for the drain-off of the reference liquid. Also, at the bottom of the measuring unit 10, a pair of heater elements 33 and 34 are provided and operated electrically together and the same, through electrical leads 36 and 37 from common leads 36'.

Within the measuring unit 10, there are two main, vertically disposed assemblies. One is the sample liquid percolating assembly 38 and the other the reference liquid percolating assembly 39. These assemblies are identical in structure and are generally defined by upright sleeves 40 and 41 respectively, which extend essentially the full length of the measuring unit 10 from top to bottom as single sleeve units.

The assemblies 38 and 39 are mounted side by side and are vertically disposed in parallel with each other within a general housing assembly which is constructed as follows: A base plate 42 is provided with a series of upright posts 43 on which a support ring 44 is horizontally mounted. Secured to the support ring 44 is the lower end of a bottom housing sleeve 45 which terminates vertically at the support ring 44, thus providing an air space 46 beneath the main body of the unit 10 with this air space open laterally to atmosphere between the posts 43. This arrangement permits air flow up through the lower portion of the overall unit 10 as will be discussed later herein, and also provides a drain pipe space for the drains 30 and 31. About midway up the overall unit 10 is the termination of the heating section of the unit, and this is in the form of a ring 47 horizontally disposed and mounted on the top of the housing sleeve 45. To this ring 47 there is mounted a series of vertical posts 48 as spacer members to open the bottom portion of the overall unit 10 again laterally to atmosphere. Thus, the construction of this device permits air flow in through the bottom and up the side walls of the housing 45 and out through a lateral air gap 49 to atmosphere.

The upper portion of the overall unit 10 is the condensing unit and has as a base a solid disc 50, which is mounted on the upper portions of the support posts 48. A top housing sleeve 51 is mounted on and sealed to the base disc 50 and has a cover 52 sealed thereon. The cover 52 seals off the condensing section of this device by connecting the top of the outside housing 51 to the tops of the overall sleeve members 40 and 41 within the housing, in a sealing fashion therewith. Thus, a chamber 53 is provided, into which cooling water is supplied through pipe 21 and exited through pipe 25 in a continuous flow of coolant surrounding both of the sleeve members 40 and 41 in the upper chamber portion thereof. The base disc 50 of the condensing portion of this overall device has openings therethrough, through which the sleeve members 40 and 41 are passed in sealing relation therewith to complete the water jacket about the upper portions of the sleeves 40 and 41. This cooling arrangement is an aid to condensation of vapor rising within either of the overall sleeves 40 and 41. Thus, for example, component concentrations of sample liquids are not changed by vaporization.

On the top of the cover plate 52, there is mounted a further series of upright posts 54 and a top plate is horizontally disposed on top of these uprights as at 55. The plate 55 is solid except for openings in which the thermometer bulbs 18 and 19 with their associated assemblies are mounted as units and which depend from the plate 55 down through the sleeves 40 and 41, through the condenser upper portion of the overall system, and down part way into the lower, heating portion of the overall system 10. The thermometer bulbs terminate in the upper section of the heating portion as indicated by 18' and 19'. The sleeves 40 and 41 which contain the thermometer bulb assemblies are open at the top through the cover plate 52 and open to atmosphere laterally under the top plate 55 and between the upright supports 54. This arrangement provides atmospheric pressure equalization on the boiling bodies of sample and reference liquid in the lower portions of the sleeves 40 and 41 as indicated respectively at 56 and 57.

The depending thermometer bulb assemblies comprise first the bulbs 18 and 19 themselves and, then surrounding these bulbs, support sleeves 58 and 59 respectvieiy, which are directly dependent from the top plate 55 and in which the thermometer bulbs 18 and 19 are centrally mounted at their tops, with small clearances for the bulbs as they extend downward within the support sleeves 58 and 59. The sleeves 58 and 59 thus provide a lateral clearance for the bulbs 18 and 19, and the sleeves generally act as shields for the bulbs and also as supports for the upper portions of the percolating systems lower down in the overall assembly. The sleeves 58 and 59 extend from the top plate 55 down through the condensing portion of the overall system 10 to a point approximating the location of the base 50 of the condensing portion of the overall unit. As a further aid to condensation, the sleeves 58 and 59 have pipe coils 60 and 61 wound respectively thereon, which are continuously supplied with cooling water through the water inlets 22 and 23 which are connected respectively to the water outlets 26 and 27. The pipe coils 60 and 61 start just below the condensing chamber top plate 52 and extend down to a point just above the condensing chamber base plate 50.

In downward continuance of the support sleeves 58 and 59, beyond the condensing portion of the unit and into the heating portion of the unit, somewhat larger and thinner walled sleeves 62 and 63 are provided. The latter sleeves 62 and 63 are upper end mounted on the lower ends of the thermometer bulb shield sleeves 58 and 59 and extend substantially down into the heating portion of the unit to define the percolator tanks 64 and 65 of the percolator systems. The bottoms of these sleeves 62 and 63 are open, but the tops are closed except for small side openings 66 and 67 which open the tanks 64 and 65 to atmosphere up through the overall sleeves 40 and 41. These openings 66 and 67 thus prevent pressures from unduly building up in the percolating tanks 64 and 65 and also provide for an overflow of liquid from these tanks. Such overflows simply drop down inside the overall sleeves 40 and 41 into the lower closed portion thereof.

The percolator tanks are further defined, about midway vertically of the sleeves 62 and 63, by a pair of floor plates 68 and 69, transversely and horizontally mounted in the sleeves 62 and 63 and having openings therethrough, through which the thermometer bulbs 18 and 19 extend downwardly to terminate just therebelow in the resistance bulb portions 18' and 19'. The sleeves 62 and 63 extend downward beyond the lower ends of the resistance bulbs, that is, the portions 18' and 19', forming protective sleeves thereabout.

Also, within the sleeves 62 and 63, there is a pair of vertically disposed pipes 70 and 71 respectively, which are the percolator pipes of the percolator systems. These pipes extend up along the inner side walls of their respective sleeves 62 and 63, terminating in closed ends at the tops thereof, and with side openings, 72 and 73 respectively, opening into their respective percolator tanks 64 and 65. The pipes 70 and 71 extend downwardly in their respective arrangements past the lower ends of the sleeves 62 and 63 and well down into the lower portion of the overall sleeves 40 and 41 to a point well below the surface of their respective liquids, that is, the sample liquid 56 and the reference liquid 57, which are normally maintained as bodies of boiling liquid in this overall system.

At the lower end of the pipes 70 and 71, upwardly and inwardly tapering funnels 74 and 75 are provided for receiving bubbles produced by boiling of the liquids 56 and 57 in the percolating action of the device, these bubbles thereafter traveling up through the pipes 70 and 71, out through the side wall openings 72 and 73 at the top of these pipes and into the percolating tanks 64 and 65. Such percolation passage of the boiling liquids up into the top chambers 64 and 65 produces percolator tank bodies of boiling liquid as indicated at 76 and 77. Boiling liquid from these percolator tank bodies of liquid thereafter flows down through the openings in the percolator tank bottoms 68 and 69 and along the lower ends 18' and 19' of the resistance bulbs to flow thereover and down, thus forming a film on each bulb which is boiling and which is at a true surface boiling temperature in representation of the true surface temperature at which the respective liquid boils. With this arrangement, any inaccuracies which might occur at the ordinary surface of the boiling liquids due to flash heating or temporary overheating is avoided, and the true temperatures are provided at which the particular liquids do boil.

The heating elements 33 and 34 are covered by protective sleeve units 78 and 79 which seal off the bottom of the overall sleeves 40 and 41, and which extend upwardly therein for a short distance and with a small clearance from the inner walls of the overall sleeves 40 and 41.

Inlets for the liquid bodies 56 and 57 are provided at the lower portion of the heating unit cover sleeves 78 and 79 as indicated at 80 and 81. Thus, there are the lower bodies of liquid, the sample at 56 and the reference at 57, and there are upper bodies of liquid, the sample at 76 and the reference at 77, in a percolator system.

Each percolator system has its own outlet in the form of an overflow vapor trap device generally indicated at 82 and 83 respectively. These traps comprise side openings 84 and 85 in the side walls respectively of the overall sleeves 40 and 41 at points somewhat below the normal desired surface level of the sample and reference liquids 56 and 57. The openings 84 and 85 lead to the side tank units 82 and 83 respectively, each of which has a vapor trap tank 88 and 89 respectively, with standpipes 90 and 91 to which the openings 84 and 85 respectively lead.

The vapor trap standpipes 90 and 91 lead upwardly to the level desired for each of the surfaces of the sample and reference liquids 56 and 57. Somewhat above their respective levels, the tanks 88 and 89 are covered as vapor traps to make sure that the composition of the sample and reference liquids stays the same, that is, that there are no vapor losses.

Each vapor trap is provided with a small upper opening, as at 88' and 89', to open the vapor traps to atmosphere. From the standpipes 90 and 91, therefore, overflow liquid, in continuance of the flow of liquid throughout this whole unit, flows over the standpipes and into the chambers 88 and 89 and out through drain pipes and down into the final drains 30 and 31 at the bottom of the whole device.

The sample liquid 56 is brought into the overall unit, as previously mentioned, through the line 11 at the side wall of the overall unit about midway vertically thereof, that is, at the top of the heating portion of the unit, and is joined at this point by the steam inlet line 28. These two lines then are wound side by side in a double coil arrangement indicated at 92, and extend around both the sample and reference sleeves 40 and 41. This double pipe coil extends from the top of the heating portion of the overall unit to a point just below the lower ends 18' and 19' of the thermometer bulbs 18 and 19. At this point, the steam line exits through the side wall of the overall unit as steam outlet line 29. From this same point on, the sample liquid inlet line extends down within the housing to the sample liquid inlet 80 which leads the sample liquid into the small clearance beside the heater element sleeve 78.

Again referring to the steam inlet 28, the steam pipe is forked, with one lead therefrom going into the double coil 92 and the other lead, indicated at 93, extending downward through the central portion of the overall unit to a needle valve 94 for controlling the flow thereof, and into a condensing pipe coil 95 which is wound around both of the overall sleeves 40 and 41 in the area of the heating elements 33 and 34. The end of the coil 95 is then connected to the reference liquid inlet 81 so as to feed the reference liquid into the small clearance between the overall sleeve 41 and the reference liquid heating element shield 79.

Thus, the sample liqiud is preheated as a result of mutually adjacent position of the sample and the steam lines in the coil 92 to a point where relatively little further heat is necessary to bring the sample to a boil by means of the heating element 33.

The reference liquid is provided from the same initial steam line, but with the steam condensed in the coil 95 by air flow up from the bottom of the unit and past the pipe coil 95 and out of the overall unit at the air passage midway vertically thereof. This air flow has no substantial effect on the sample steam line since the sample steam is provided in abundance and a suitable trapping arrangement (not shown) may be provided for steam condensate.

The reference material is first put through the needle valve 94 and then passed around the lower portion of the device where it is cooled sufficiently to provide a reference body which is a liquid just below its boiling point.

In this fashion, reference and sample liquids are readily and continuously boiled and percolated up through the tubes 70 and 71 and then dripped down into the main body and overflowed into the drains. With this arrangement, therefore, a continuous flow of both sample liquid and reference liquid is provided through the entire device.

In the specific arrangements shown and described in this device by way of illustration of this invention, a differential measurement system is used which indicates a departure from a normal or set boiling temperature condition in the sample liquid. The outputs of the thermometer bulbs are referenced against each other in conventional fashion so that a change in the sample liquid will appear as a differential. With the arrangements shown, such differential may be used to control the sample inlet stream to bring the system back to a balance. Thus, with this differential arrangement, barometric pressure effects are canceled out since they are applied both to the reference and to the sample liquids simultaneously. Similarly, it is not necessary in this differential system to measure the exact temperature as such but only on a relative basis.

Under conditions where the ambient pressure is not subject to material change or where it is controlled, a single unit, that is to say, the sample unit alone may be used to measure the temperature at which a particular liquid boils, with suitably calibrated thermometer arrangements.

This invention, therefore, provides a new and improved temperature measurement system.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

A system for continuously and differentially providing a representation of the temperature at which a flowing body of liquid boils, comprising a heating assembly and a condensing assembly mounted thereon, an air flow jacket around said heating assembly, a liquid flow coolant jacket around said condensing assembly, a sample liquid percolator system extending as a unit into both said heating and condensing assemblies, a reference liquid percolator system in structural duplication of said sample liquid percolator system and also extending as a unit into both said heating and condensing assemblies, a heating coil for preheating sample liquid prior to its entrance into said sample liquid percolator system, a condensing coil in said air flow jacket for providing reference material in liquid phase in said reference percolator system, a vapor trap liquid outlet unit in each of said percolator systems, and a pair of thermometer bulbs, one in the drain-off of said sample liquid percolator system and one in the drain-off of said reference liquid percolator system, whereby the outputs of said thermometer bulbs are available for a differential representation of the boiling temperature condition of said sample liquid, each of said percolator systems comprising a boiling tank, means for continuously supplying a flowing liquid to said boiling tank, a percolator tube with its lower end in said boiling tank below the normal liquid level thereof, a percolator tank above said boiling tank and arranged to drip into said boiling tank, with the upper end of said percolator tube arranged to discharge into said percolator tank, a passage to atmosphere from both of said tanks and through said condensing assembly, and with one of said thermometer bulbs between each of said percolator tanks and its related boiling tank with the dripping of each percolator tank arranged to flow over its related thermometer bulb into its related boiling tank.

References Cited in the file of this patent

UNITED STATES PATENTS 2,594,683    Rolfson _____ Apr. 29, 1952

OTHER REFERENCES

Journal of the American Chemical Society, vol. 41, pages 721–729, by F. G. Cottrell; 1919.

Ebulliometric Measurements, by W. Swietoslawski, pages 14 and 58–62; 1945.